(12) United States Patent
Scholte-Wassink

(10) Patent No.: US 8,057,174 B2
(45) Date of Patent: Nov. 15, 2011

(54) METHOD FOR CONTROLLING A WIND TURBINE USING A WIND FLOW MODEL

(75) Inventor: Hartmut Scholte-Wassink, Lage (DE)

(73) Assignee: General Electric Company, Schenectady, NY (US)

(*) Notice: Subject to any disclaimer, the term of this patent is extended or adjusted under 35 U.S.C. 154(b) by 683 days.

(21) Appl. No.: 12/248,238

(22) Filed: Oct. 9, 2008

(65) Prior Publication Data

US 2010/0092291 A1    Apr. 15, 2010

(51) Int. Cl.
*B63H 3/00* (2006.01)
*B64C 11/00* (2006.01)
*B64C 27/00* (2006.01)
*F03B 7/00* (2006.01)

(52) U.S. Cl. ............ 416/35; 416/30; 416/37; 290/44; 290/55

(58) Field of Classification Search ............ 416/1, 30, 416/35, 37, 41, 61; 415/1, 4.3, 155; 290/43, 290/44, 55
See application file for complete search history.

(56) References Cited

U.S. PATENT DOCUMENTS

| | | | |
|---|---|---|---|
| 6,850,821 B2 * | 2/2005 | Weitkamp | 700/286 |
| 6,909,198 B2 * | 6/2005 | Ragwitz et al. | 290/44 |
| 6,940,186 B2 * | 9/2005 | Weitkamp | 290/44 |
| 7,363,808 B2 * | 4/2008 | Ormel et al. | 73/170.01 |
| 7,447,613 B2 * | 11/2008 | Mertins et al. | 703/1 |
| 7,560,823 B2 * | 7/2009 | Schellings | 290/44 |
| 7,571,013 B2 * | 8/2009 | Altemark | 700/34 |
| 7,895,018 B2 * | 2/2011 | Nies | 702/188 |

FOREIGN PATENT DOCUMENTS

| | | |
|---|---|---|
| EP | 1460266 A2 | 9/2004 |
| EP | 1770278 A2 | 4/2007 |
| WO | 9842980 A1 | 10/1998 |
| WO | 2007045940 A1 | 9/2004 |
| WO | WO2004/074881 A1 | 9/2004 |

OTHER PUBLICATIONS

Search Report from corresponding EP Application No. 09171843.7 dated Apr. 29, 2011.

* cited by examiner

*Primary Examiner* — Chris Chu
(74) *Attorney, Agent, or Firm* — Global Patent Operation; Douglas D. Zhang

(57) ABSTRACT

A control device is provided which is adapted for controlling at least one operational parameter of a wind turbine including a machine nacelle and a rotor having at least one rotor blade. The control device includes an input adapted for inputting a signal which is indicative of environmental data of the wind turbine, an evaluation unit adapted for generating at least one control signal on the basis of currently acquired environmental data and on the basis of previously acquired environmental data, and an output adapted to output the control signal adapted for adjusting the at least one operational parameter of the wind turbine.

24 Claims, 7 Drawing Sheets

METHOD FOR CONTROLLING A WIND TURBINE USING A WIND FLOW MODEL

BACKGROUND

The present disclosure generally relates to wind turbines for transforming wind energy into a rotational torque for driving electrical generators, and in particular relates to a method and a device for controlling operational parameters of a wind turbine.

Wind turbines are of increasing importance as an environmentally safe and relatively inexpensive alternative energy source. The increased demand for an improved wind turbine performance has triggered many efforts concerning an efficient control of operational parameters of the wind turbine, such as the yaw angle of a machine nacelle of the wind turbine and/or a pitch angle of at least one rotor blade about a longitudinal axis of the at least one rotor blade.

In wind turbines an adjustment of the pitch angle of a rotor blade is provided, wherein the pitch angle is the angle of the rotor blade with respect to the incoming air flow. An adjustment of the pitch angle is performed about the rotor blade axis. Furthermore pitching or bending moments in main shafts of wind turbines may be measured in order to provide an input for a control.

SUMMARY

In view of the above, a control device adapted for controlling at least one operational parameter of a wind turbine including a machine nacelle and a rotor having at least one rotor blade is provided, said control device including an input adapted for inputting a signal which is indicative of environmental data of the wind turbine, an evaluation unit adapted for generating at least one control signal on the basis of currently acquired environmental data and on the basis of previously acquired environmental data, and an output adapted to output the control signal adapted for adjusting the at least one operational parameter of the wind turbine.

According to another aspect a wind turbine including a machine nacelle and a rotor having at least one rotor blade is provided, said wind turbine further including a wind sensor unit adapted for measuring a direction and a velocity of incoming wind as wind data at at least one radial position of the at least one rotor blade, a rotation sensor adapted for detecting a rotational position of the rotor of the wind turbine, a pitch angle adjustment unit adapted for adjusting a pitch angle of at least one rotor blade, and a control device including an evaluation unit adapted for generating at least one control signal on the basis of currently acquired wind data and on the basis of previously acquired wind data, wherein the control signal is adapted for adjusting the pitch angle of at least one rotor blade.

According to yet another aspect a method for controlling at least one operational parameter of a wind turbine including a machine nacelle and a rotor having at least one rotor blade, said method including the steps of measuring of actual environmental data at the location of the wind turbine, storing the measured environmental data, generating at least one control signal on the basis of currently acquired environmental data and on the basis of previously acquired environmental data, and adjusting the at least one operational parameter of the wind turbine on the basis of the control signal.

Further exemplary embodiments are according to the dependent claims, the description and the accompanying drawings.

DRAWINGS

A full and enabling disclosure of the present invention, including the best mode thereof, to one of ordinary skill in the art is set forth more particularly in the remainder of the specification including reference to the accompanying drawings wherein.

DETAILED DESCRIPTION

Figure 1:
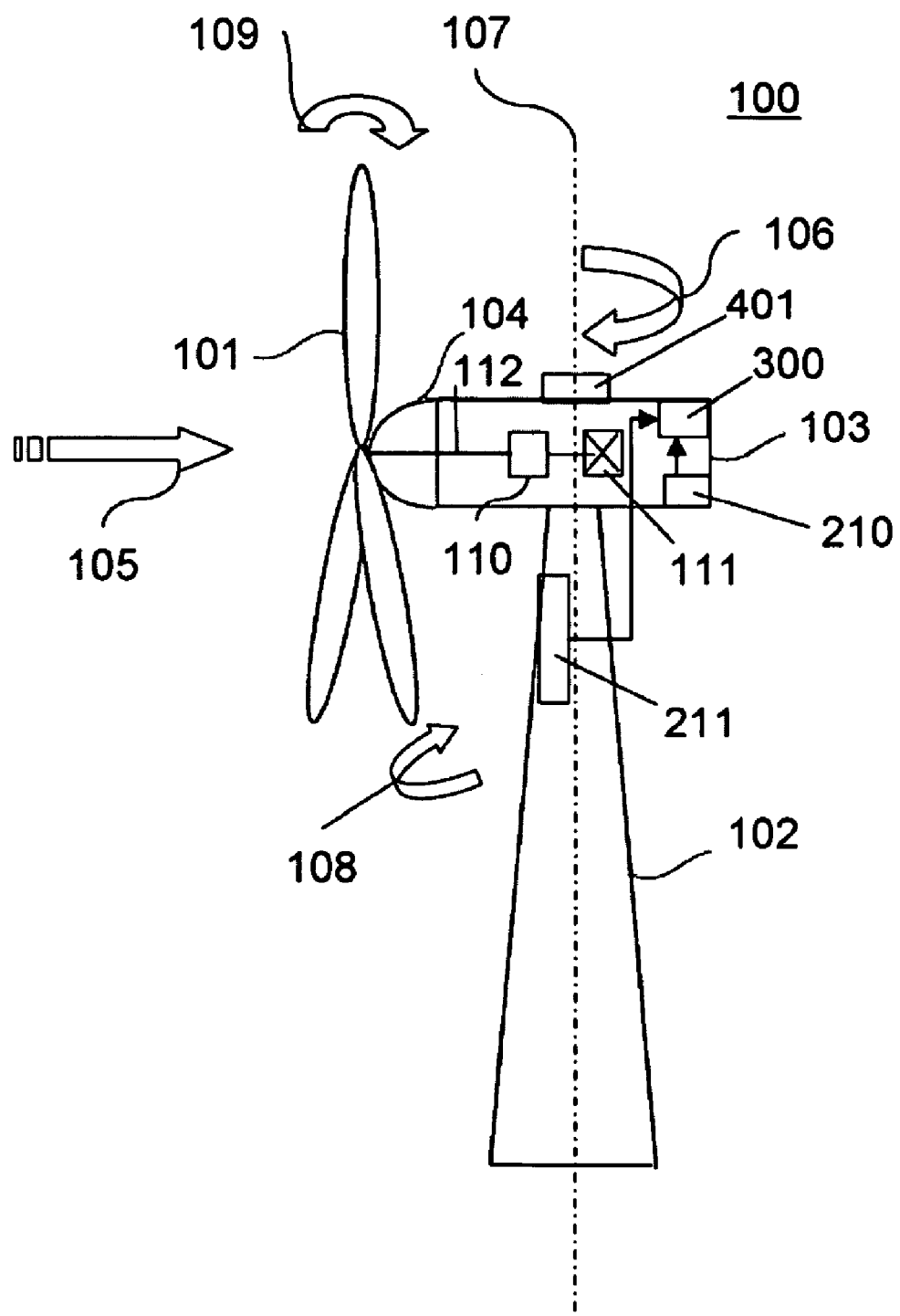
FIG. 1 is a side view of a wind turbine having a tubular tower and a rotatable machine nacelle atop the tubular tower which includes a control device according to a typical embodiment.

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

FIG. 1 is a side view of a wind turbine 100 according to a typical embodiment. The wind turbine 100 includes a tubular tower 102 and a machine nacelle 103 arranged rotatably atop the tubular tower 102. The machine nacelle 103 is rotatable about a vertical axis 107 of the tubular tower 102. The rotation angle about the vertical axis 107 is shown to be a yaw angle 106 of the wind turbine.

In order to adjust the yaw angle 106 of the wind turbine 100, a yaw angle adjustment unit 401 is provided at the machine nacelle 103. The machine nacelle 103 includes a rotor having at least one rotor blade 101 for converting wind energy into rotational energy about a main shaft 112. The rotor includes a hub 104 provided as a connection between the at least one rotor blade 101 and the main shaft 112 which typically rotates about a horizontal axis. The yaw angle 106 is adjusted with respect to the incoming wind direction 105.

Due to horizontal wind shear, a pitching moment 109 may occur which acts about a horizontal axis which is typically perpendicular to both the vertical axis 107 and the main shaft 112. The pitching moment may be adjusted by a pitch angle 106 of the at least one rotor blade during one rotation of the rotor. The pitch angle 108 is the angle of the rotor blade (airfoil) with respect to the incoming air flow 105 wherein an adjustment of the pitch angle 108 is performed about the rotor blade axis. Environmental conditions such as wind direction and wind velocity may be measured directly via anemometer units (not shown in FIG. 1) or indirectly via a nacelle-based sensor system 210 or a tower-based sensor system 211.

The pitching moment in the main shaft 112 of the wind turbine 100 may be measured in order to provide an input for a load control. Such load control is dependent on environmental conditions, e.g. the load control is dependent on the wind velocity and the wind direction of the incoming wind. The operational parameters such as the yaw angle of the machine nacelle and the pitch angle of the rotor blades are adapted with respect to changing wind velocities and wind directions. Thus, an efficient control of operational parameters of the wind turbine will provide a good energy conversion from wind energy into rotational energy for driving the electrical generator.

The nacelle-based sensor system 210 and the tower-based sensor system 211 may be used for the measurement of pitching moments occurring during the rotation of the rotor and resulting from wind forces and/or wind shear.

Figure 2:
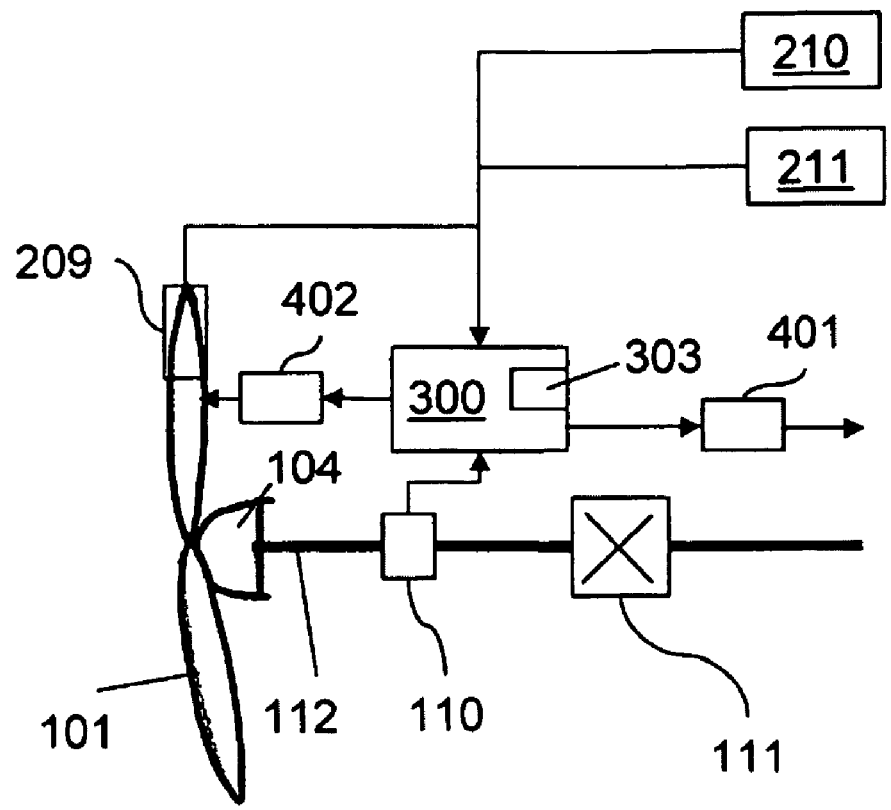
FIG. 2 is a detailed view of sensor and control units provided within the machine nacelle of the wind turbine shown in FIG. 1.

FIG. 2 is a detailed view of components provided with the machine nacelle 103 of the wind turbine 100 shown in FIG. 1. The hub 104 which is connected to the at least one rotor blade 101 provides a rotation of the main shaft 112. The main shaft 112 is connected to a gear box 111 in order to adapt the rotational frequency of the rotating rotor to a rotational input frequency of an electrical generator (not shown in FIG. 2). A rotational position of the rotor is detected by means of a rotation sensor 111 which is connected to the rotatable main shaft 112.

An output signal of the rotation sensor 110 is supplied to a control device 300. Furthermore, the at least one rotor blade 101 may include a blade-based sensor system 209 which provides sensor signals such as wind velocity and wind direction, before the control device 300. Furthermore, the control device 300 receives output signals from the nacelle-based sensor system 210 and the tower-based sensor system 211. The control device 300 according to a typical embodiment moreover includes a evaluation unit 303 which is used to predict future environmental data from currently acquired environmental data and previously acquired environmental data. The evaluation procedure will be explained in detail with respect to FIGS. 4-7.

An output signal of the control device 300 is supplied to a yaw angle adjustment unit 401 for adjusting a yaw angle of the machine nacelle with respect to the incoming wind direction 105 (FIG. 1). Furthermore, an output signal of the control device 300 is supplied to a pitch angle adjustment unit 402 of the at least one rotor blade 101 in order to adjust a pitch angle 108 of the at least one rotor blade (FIG. 1).

Figure 3:
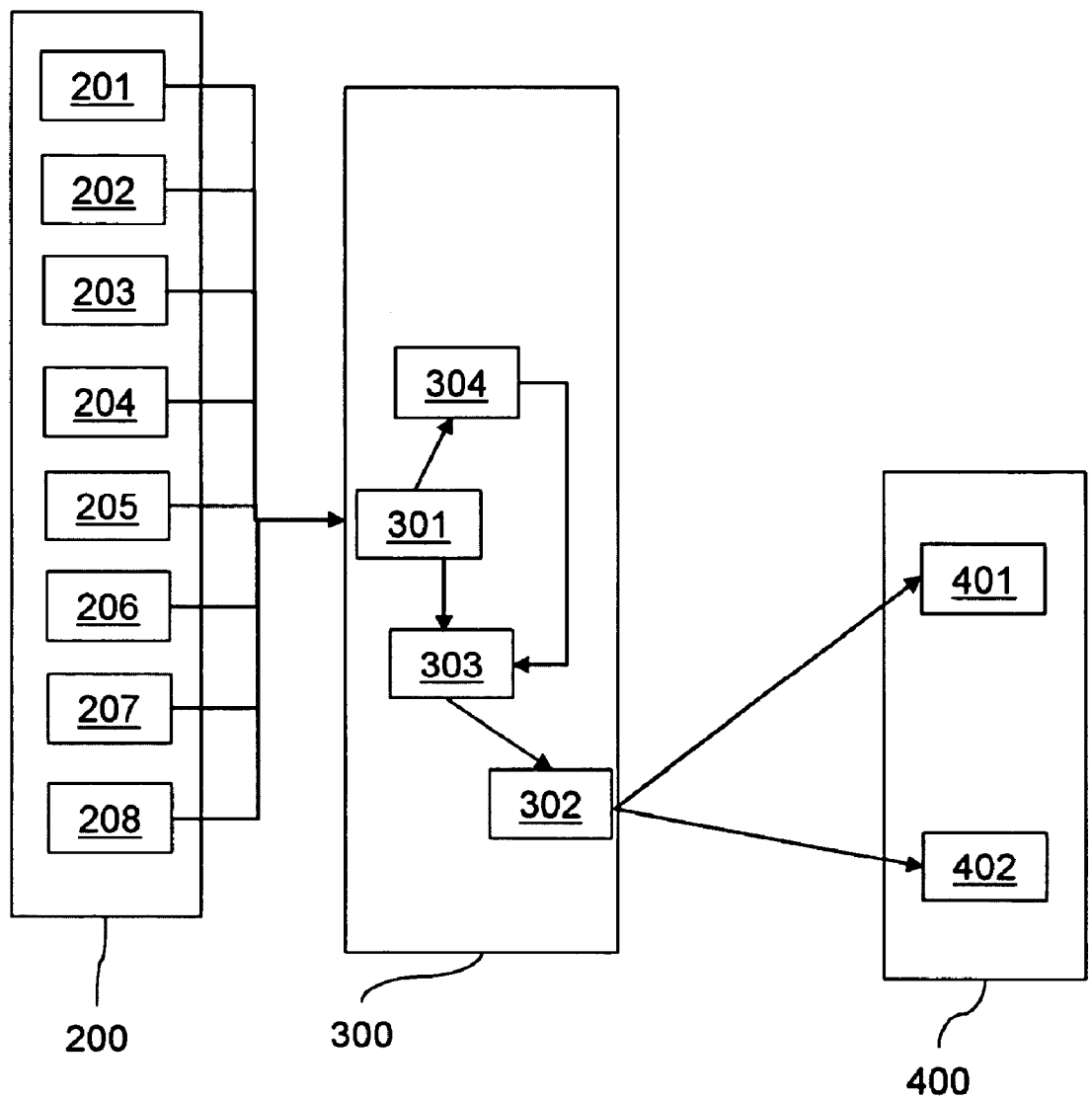
FIG. 3 depicts a block diagram of a control device being provided with sensor data from a data acquisition unit and providing control signals for an actuator device, according to a typical embodiment.

FIG. 3 is a block diagram of a control system including a data acquisition unit 200, a control device 300 and an actuator device 400. Data obtained from the data acquisition unit 200 are provided for the control device 300 where a data analysis and a future data evaluation are carried out as will be described with respect to FIG. 4-7 herein below.

The data acquisition unit 200 may include, amongst others, at least one pilot tube sensor which is attached at the at least one rotor blade 101. The pilot tube sensor 201 is part of the blade-based sensor system 209 described with respect to FIG. 2. Furthermore, the data acquisition unit 201 may include a wind direction sensor 202 and a wind speed sensor 203. The combination of the wind direction sensor 202 and the wind speed sensor 203 may be provided as an anemometer unit which is part of a nacelle-based sensor system 210 described with respect to FIG. 2. Furthermore, the nacelle-based sensor system 210 may include the rotation sensor 110 which is connected to the main shaft 112 as described herein above.

Moreover an air pressure sensor 204, a temperature sensor 205 and a humidity sensor 206 may be provided as components of the nacelle-based sensor system 210. The anemometer unit 207 is used for providing data about the wind direction and the wind speed, e.g. the wind vector. The nacelle-based sensor system 210 may include a pitching moment detector 208 for detecting the pitching moment 109 which is caused e.g. by a horizontal wind shear as described with respect to FIG. 1.

One or more output signals of the sensors included in the data acquisition unit 200 is provided for the control device 300. The control device 300 includes an input unit 301 for inputting the at least one sensor signal and an output unit 302 for outputting control signals for the actuator device 400. The output signal is provided on the basis of the currently available input signal and input signals which have been previously acquired, e.g. before the actual measurement is carried out. In another typical embodiment the output signal is provided as a function of the currently available input signal and input signals which have been previously acquired.

Thus, the control system 300 is capable of generating an output signal, e.g. a control signal, on the basis of currently acquired environmental data and on the basis of previously acquired environmental data. Sensor signals which have been input into the input unit 301 are stored in a memory unit 304 of the control device 300. Furthermore, sensor signals which have been input into the input unit 301 are fed to a evaluation unit 303 which will be explained in detail with respect to FIG. 4. An output signal of the evaluation unit 303 is fed to the output unit 302 for outputting control signals (output signals) for the actuator device 400.

The evaluation unit 303 receives two kinds of input signals, e.g. an input signal directly from the input unit 301, e.g. the at least one sensor signal which has been received by at least one sensor included in the data acquisition unit 200, and a previously acquired sensor signal which has been stored, for a predeterminable time, in the memory unit 304.

The control signals (output signals) which are output by the output unit 302 of the control device 300 are fed to the actuator device 400. The actuator device 400 typically includes a yaw angle adjustment unit 401 and a pitch angle adjustment unit 402. The yaw angle adjustment unit 401 is used for adjusting the yaw angle 106 of the machine nacelle, e.g. a rotation about the vertical axis 107 (see FIG. 1). The pitch angle adjustment unit 402 is used for adjusting the pitch angle 108 of the at least one rotor blade 101 (see FIGS. 1 and 2).

The yaw angle 106 and the pitch angle 108 of the wind turbine 100 are typical operational parameters which may be adjusted during the operation of the wind turbine 100. The pitch angle adjustment may be provided on the basis of the rotor position of the rotor of the wind turbine 100, e.g. the pitch angle control signal may be provided on the basis of the rotational position of the rotor.

In order to provide an efficient control of operational parameters of the wind turbine 100, the data acquisition unit 200 may provide further environmental data by applying additional sensors at the at least one rotor blade 101, e.g. a pilot tube, a pitot tube, a sonic anemometer, a pitching moment detector and a laser Doppler anemometer.

Furthermore, the pitching moment detector is adapted for detecting the pitching moment 109 of the rotor wherein the pitch angle 108 may be adjusted on the basis of the control signal.

The wind direction sensor 202 and the wind speed sensor 203 may be combined in the anemometer unit 207 or may be provided separately within the anemometer unit.

Figure 4:
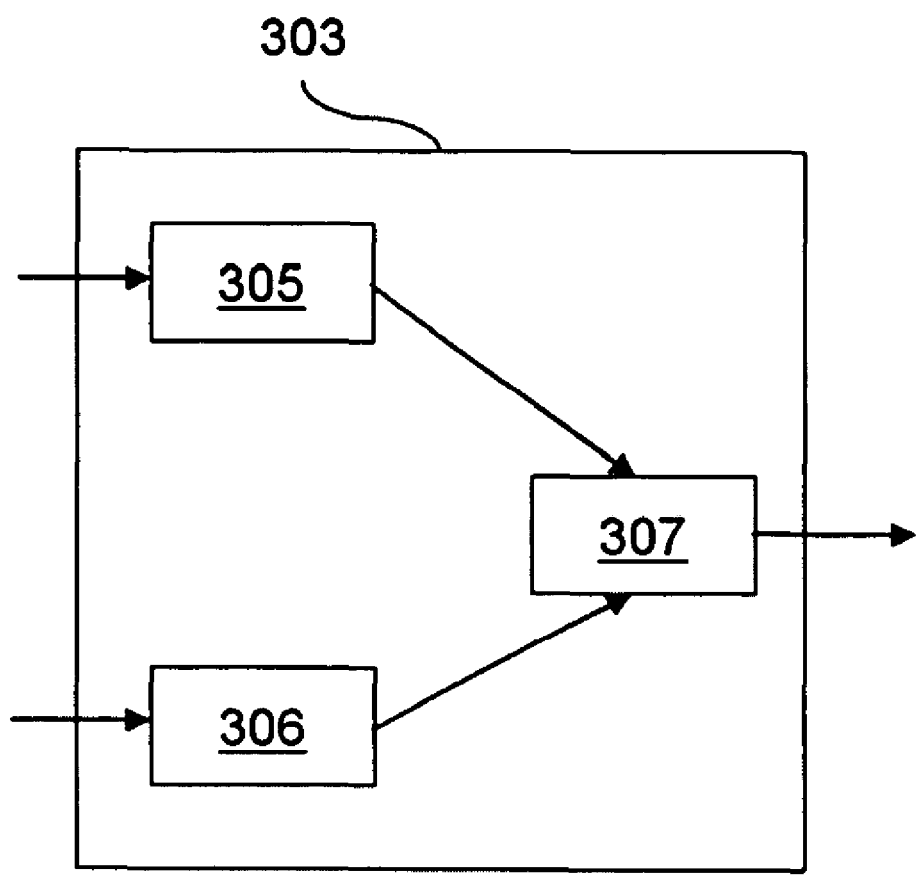
FIG. 4 is a block diagram showing a data flow within a evaluation unit of the control device shown in FIG. 3.

FIG. 4 is an illustrative block diagram showing the essential components of the evaluation unit 303 of the control device 300 shown in FIG. 3. The evaluation unit 303 is provided with currently acquired environmental data 306 and with previously acquired environmental data 305. From both these data, future environmental data 307 are calculated and output.

The actual environmental data are measured at the location of the wind turbine 100 and are stored in the memory unit 304 such that previously acquired environmental data 305 are available. Furthermore currently acquired environmental data 306 are delivered by actual measurements using the data acquisition unit 200 (FIG. 3). Thus at least one control signal may be generated on the basis of currently acquired environmental data and on the basis of previously acquired environmental data.

The step of generating the at least one control signal on the basis of currently acquired environmental data and on the basis of previously acquired environmental data includes the steps of providing at least one maximum allowable difference value between currently acquired environmental data and future environmental data.

The at least one maximum allowable difference value is calculated using a wind flow model based on fluid mechanics. If the relevant environmental data are wind velocity and wind direction (v, α), for example, then the two maximum allowable difference values between currently acquired environmental data and future environmental data are the maximum velocity difference and the maximum angle difference according to the following relations (1) and (2):

$$\Delta v < \Delta v_{max} \quad (1)$$

$$\Delta \alpha < \Delta \alpha_{max} \quad (2)$$

Based on fluid mechanic equations, the maximum difference velocity $\Delta v_{max}$ and the maximum angle difference $\Delta \alpha_{max}$ may be evaluated. Data points which are provided for the model calculations based on fluid mechanics are depicted with respect to FIGS. 5 and 6.

Figure 5:
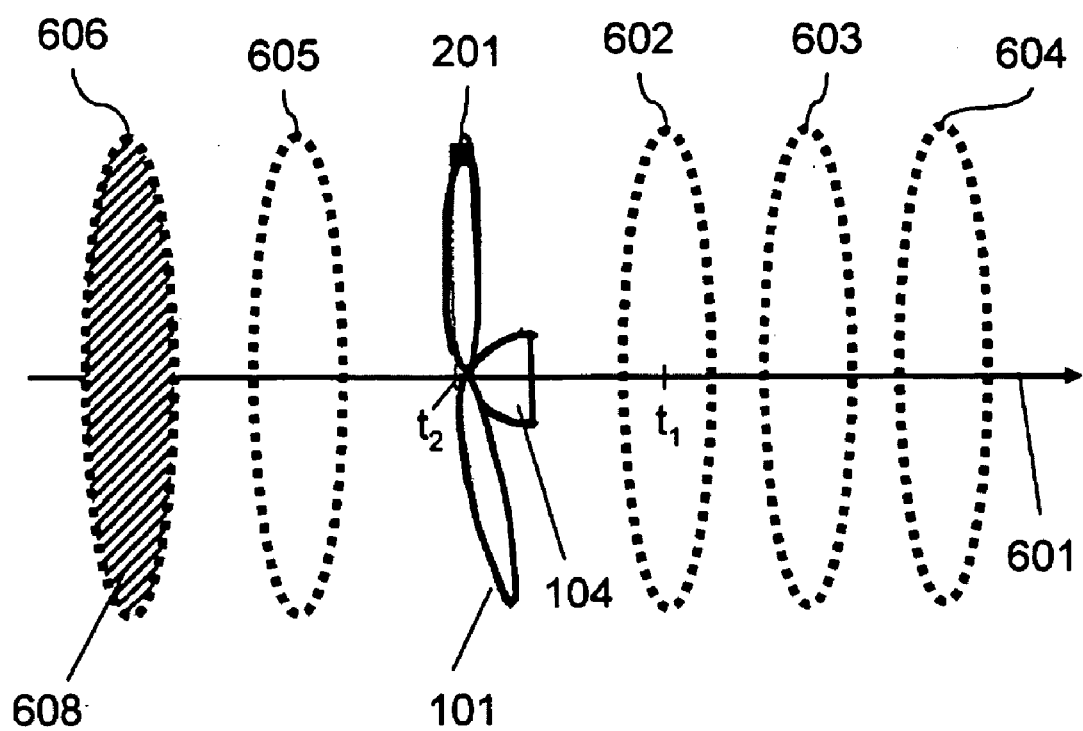
FIG. 5 illustrates data points obtained during one rotation of the rotor of a wind turbine for different moments in time on a time axis.

FIG. 5 shows a sweep area (rotor area) 608 which is traversed by the at least one rotor blade 101 of the rotor of the wind turbine 100 during one rotation. The sweep area is filled with data points, wherein the data are obtained, e.g. from pressure sensors attached at the rotor blade. FIG. 5 shows a pilot tube sensor 201 which is attached at an outer region of a rotor blade 101 of the wind turbine 100.

The at least one rotor blade 101 is attached to the hub 104 of the wind turbine 100 such that a rotational position of the at least one rotor blade 101 may be determined using the rotation sensor 110 (FIG. 2). FIG. 5 shows equidistantly acquired data points using the pilot tube sensor 201, wherein wind velocity and wind direction may be determined simultaneously at one circumferential data point. During the rotation of the rotor of the wind turbine several data points are acquired. Reference numeral 601 depicts a time axis such that elapse the time increases from left to right. Thus, previous wind data 602, 603 and 604 are data which have been previously acquired by the data acquisition unit 200. These data may be stored in the memory unit 304 of the control device 300 (FIG. 3).

Typically, the previously acquired environmental data (wind velocity and wind direction in this case) are stored for 30 seconds and are then overwritten by currently acquired environmental data. From the model simulation based on the wind flow model using fluid mechanics, previously acquired environmental data and currently acquired environmental data at an instant of time shown at the position of the pilot tube sensor 201, future environmental data 605, 606 may be obtained.

Typical time differences between the current time (the time where the pilot tube sensor 201 is shown in FIG. 5) and the future time (positions 605 and 606) are in the range of 1 to 10 seconds, and more typically amount to about 5 seconds. By using future environmental data 605, 606 (in this case wind data, e.g. future wind data 605 and future wind data 606), the at least one operational parameter, e.g. the yaw angle 106 and the pitch angle 108 (see FIG. 1), may be adjusted in advance.

Thus, when the environmental conditions (future wind data) are present at the location of the wind turbine, the yaw angle and/or the pitch angle 108 of the wind turbine 100 are adjusted in accordance with the actual wind data such that an efficient energy conversion from wind energy into rotational energy is obtained. The maximum allowable difference values, e.g. the maximum allowable difference in wind velocity $\Delta v_{max}$ (relation (1) above), and the maximum allowable yaw angle difference $\Delta \alpha_{max}$ (relation (2) above) are difference values occurring between two adjacent data points.

Figure 6:
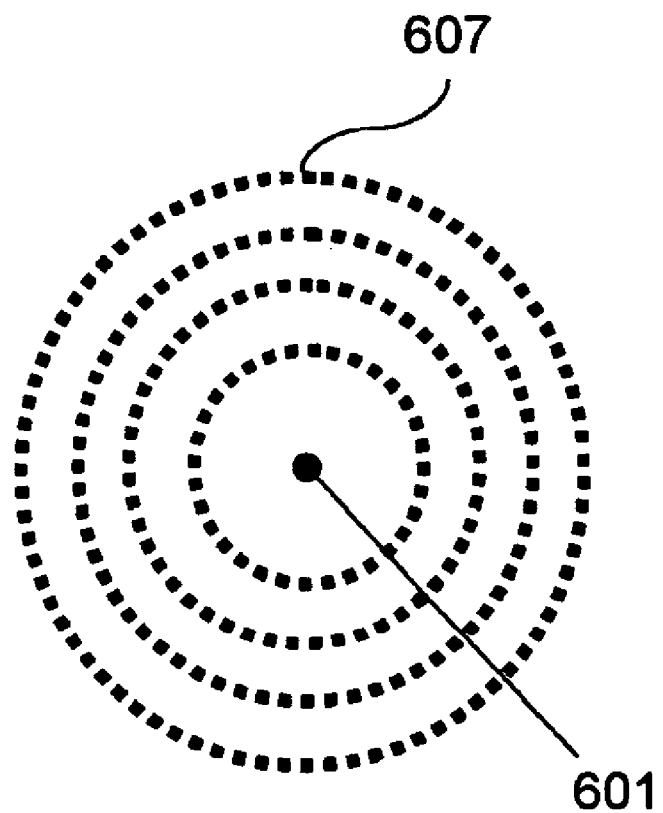
FIG. 6 is another illustration of data points obtained during one rotation of a rotor blade for a specific moment in time.

FIG. 6 shows the situation shown in FIG. 5 for a fixed position in time 601, viewed normal to the rotor area (sweep area of the at least one rotor blade 101) 608. Data points 607 are circumferentially equispaced at different radial positions, as shown in FIG. 6. Maximum difference values between currently acquired environmental data and future environmental data between two (circumferentially and/or radially) adjacent data points are determined using relations (1) and (2) mentioned above.

In accordance with fluid mechanics, the maximum difference value which is allowed between two adjacent data points is dependent on the change in time of all remaining data points. Thus it is possible, using previously acquired environmental data and currently acquired environmental data, to derive a difference value between data points which correspond to each other. In the situation shown in FIG. 6, data points which correspond to each other are data points which are acquired at the same radial position and at the same rotation angle which is measured by the rotation sensor 110 (FIG. 2).

A change of corresponding data points between a previously acquired data set and a currently acquired data set results in a determinable change between the currently acquired data set and a future acquired data set (605, 606, if wind data are concerned, see FIG. 5). Due to physical restrictions based on fluid mechanics, the measured difference values are correlated to each other such that a data set of future environmental data is obtained.

Thus it is possible to adjust the yaw angle 106, the pitch angle 108, etc. for future environmental data in order to provide an efficient energy conversion from wind energy into rotational energy. The differences in environmental data may be the result of turbulences, wind shear, yaw arrow operation, tower shadow, wake effects, etc. According to a typical embodiment, future environmental data are used to preset the at least one operational parameter of the wind turbine 100 before the actual environmental condition occurs. Input data of the wind flow model are environmental data such as aerodynamic flow properties including at least one of a wind direction and a wind velocity at the location of the wind turbine.

Figure 7:
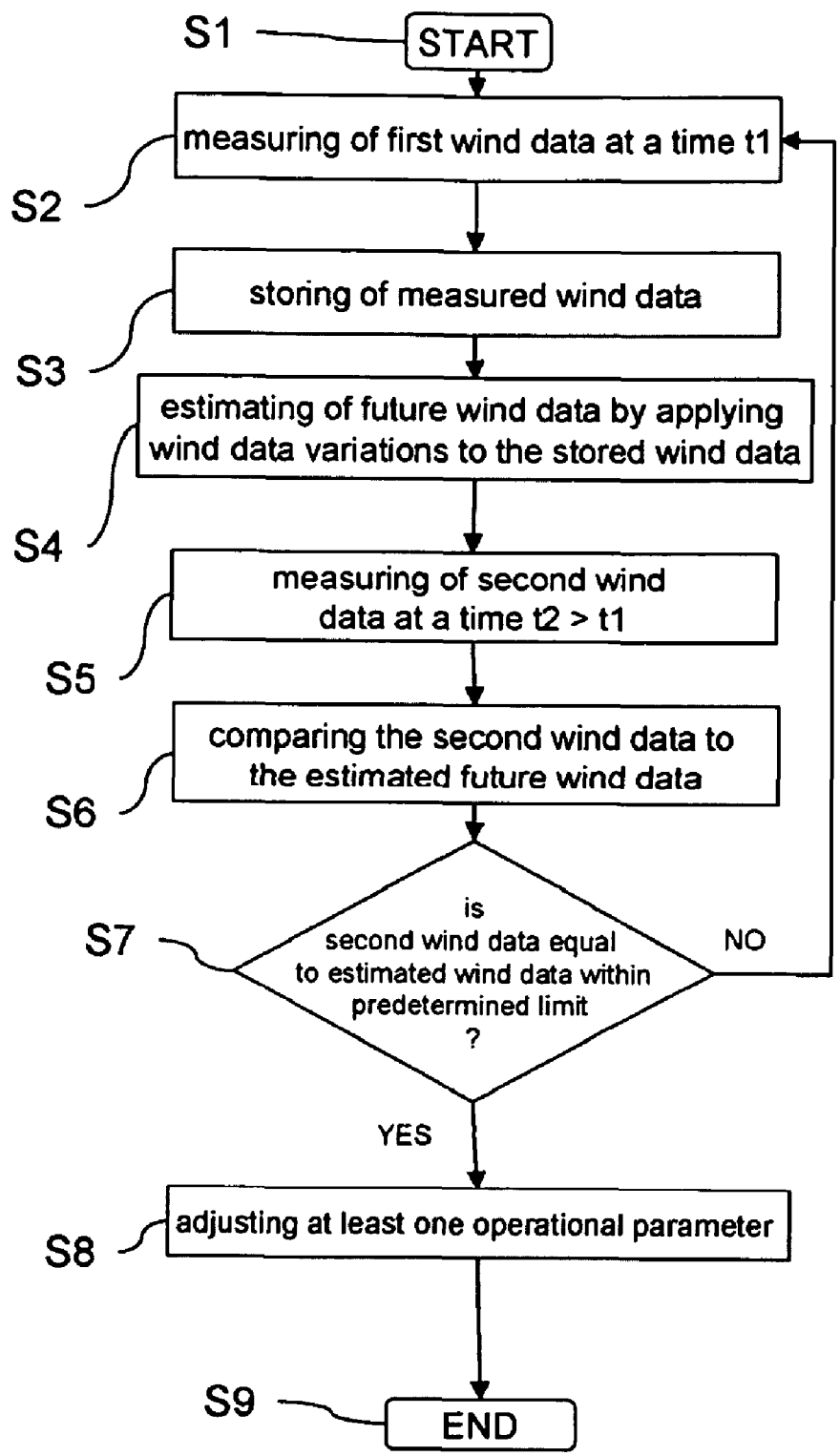
FIG. 7 is a flowchart illustrating a method for controlling at least one operational parameter of a wind turbine according to a typical embodiment.

FIG. 7 is a flowchart illustrating a method for controlling at least one operational parameter of a wind turbine 100 including a machine nacelle 103 and a rotor having at least one rotor blade 101 according to a typical embodiment. At a first step S1, the procedure is started. Then, the actual environmental data, e.g. the first wind data, are measured at a time $t_1$ (the time at which the previous wind data 602 are measured, see FIG. 5). Once the first wind data have been measured, these wind data are stored in the memory unit 304 (FIG. 3) of the control device 300 at a step S3.

At a step S4, the wind flow model based on fluid mechanics is applied (see above relations (1) and (2)) such that future environmental data (e.g. future wind data) may be estimated by applying wind data variations to the stored wind data (step S4). At a time $t_2$, which is larger than the time $t_1$, second wind data (second environmental data) are measured at a step S5.

At a following step S6, the second wind data measured at the time $t_2$ are compared to the estimated future wind data.

At a step S7 it is determined whether the second wind data correspond to the estimated wind data within a predetermined limit. If the second wind data are not equal to the estimated wind data within the predetermined limit ("NO" in step S7), the procedure returns to step S2 where the first wind data are measured at a time $t_1$.

If it is determined at step S7, that the second wind data are equal to the estimated wind data within the predetermined limit ("YES" at step S7), then the at least one operational parameter (e.g. the yaw angle 106 and/or the pitch angle 108 of the wind turbine 100, see FIG. 1) is adjusted at a step S8. After the adjustment of the at least one operational parameter, the procedure is ended at a step S9.

It is noted here that several sensors may be arranged along the length of the at least one rotor blade 101. Thus it is possible to attach pilot tube sensors which are adapted for measuring both the wind velocity and the wind direction, i.e. the wind vector at a radial position of the rotor blade, and which may be arranged along the length of the at least one rotor blade. Furthermore, the wind flow model according to a typical embodiment may be supplied with other data which are provided by the nacelle-based sensor system 210 and/or the tower-based sensor system 211 (see FIG. 2).

Furthermore it is noted that, in case the at least one operational parameter adjusted according to the future environmental data is the pitch angle 108 of the at least one rotor blade 101 of the wind turbine 100, a continuous pitching of the at least one rotor blade may be performed on the basis of the control signal provided for the pitch angle adjustment unit 402 (see FIGS. 2 and 3).

The continuous pitching is possible if the at least one control signal is generated continuously on the basis of currently acquired environmental data and on the basis of previously acquired environmental data which are stored in the memory unit 304.

The environmental data which are currently acquired and which have been stored in the memory unit 304 may be at least one of a wind direction, a wind velocity, an angle of attack, an environmental temperature, an ambient air pressure, an ambient air density at the location of the wind turbine, a humidity at the location of the wind turbine, pitching moments of the wind turbine, etc.

The invention has been described on the basis of embodiments which are shown in the appended drawings and from which further advantages and modifications emerge. However, the invention is not restricted to the embodiments described in concrete terms, but rather can be modified and varied in a suitable manner. It lies within the scope of the invention to combine individual features and combinations of features of one embodiment with features and combinations of features of another embodiment in a suitable manner in order to arrive at further embodiments.

It will be apparent to those skilled in the art, based upon the teachings herein, that changes and modifications may be made without departing from the invention disclosed and its broader aspects. That is, all examples set forth herein above are intended to be exemplary and non-limiting.

The invention claimed is:

1. A control device adapted for controlling at least one operational parameter of a wind turbine comprising a machine nacelle and a rotor having at least one rotor blade, said control device comprising:
   an input adapted for inputting a signal which is indicative of environmental data of the wind turbine;
   an evaluation unit adapted for generating at least one control signal on the basis of currently acquired environmental data and on the basis of previously acquired environmental data; and
   an output adapted to output the control signal adapted for adjusting the at least one operational parameter of the wind turbine.

2. The control device in accordance with claim 1, wherein a data acquisition unit is provided which is adapted for acquiring environmental data of the wind turbine.

3. The control device in accordance with claim 2, wherein the data acquisition unit comprises at least one of a pilot tube, a pitot tube, a sonic anemometer, a pitching moment detector and a laser Doppler anemometer.

4. The control device in accordance with claim 1, wherein an actuator unit is provided which is adapted for adjusting the at least one operational parameter of the wind turbine on the basis of the control signal.

5. The control device in accordance with claim 1, wherein the at least one operational parameter is a yaw angle of the machine nacelle of the wind turbine.

6. The control device in accordance with claim 1, wherein the at least one operational parameter is a pitch angle of the at least one rotor blade of the wind turbine.

7. The control device in accordance with claim 1, wherein the at least one control signal is provided on the basis of the rotational position of the rotor.

8. The control device in accordance with claim 1, wherein the environmental data are aerodynamic flow properties comprising at least one of a wind direction and a wind velocity at the location of the wind turbine.

9. The control device in accordance with claim 1, wherein a memory unit is provided which is adapted for storing the previously acquired environmental data.

10. The control device in accordance with claim 1, wherein a yaw angle adjustment unit is provided which is adapted for adjusting a yaw angle of the machine nacelle on the basis of the at least one control signal.

11. The control device in accordance with claim 1, wherein a pitch angle adjustment unit is provided which is adapted for adjusting a pitch angle of the at least one rotor blade on the basis of the at least one control signal.

12. A wind turbine comprising a machine nacelle and a rotor having at least one rotor blade, said wind turbine further comprising:
   a wind sensor unit adapted for measuring a direction and a velocity of incoming wind as wind data at at least one radial position of the at least one rotor blade;
   a rotation sensor adapted for detecting a rotational position of the rotor of the wind turbine;
   a pitch angle adjustment unit adapted for adjusting a pitch angle of at least one rotor blade; and a control device comprising an evaluation unit adapted for generating at least one control signal on the basis of currently acquired wind data and on the basis of previously acquired wind data,
wherein the control signal is adapted for adjusting the pitch angle of at least one rotor blade.

13. The wind turbine in accordance with claim 12, further comprising a yaw angle adjustment unit adapted for adjusting a yaw angle of the machine nacelle on the basis of the control signal.

14. The wind turbine in accordance with claim 12, further comprising at least one pitching moment detector adapted for detecting a pitching angle of the rotor, wherein the pitch angle is adjusted on the basis of the control signal.

15. The wind turbine in accordance with claim 12, wherein a wind direction sensor and a wind velocity sensor are provided separately within the wind sensor unit.

16. A method for controlling at least one operational parameter of a wind turbine comprising a machine nacelle and a rotor having at least one rotor blade, said method comprising:
measuring of actual environmental data at the location of the wind turbine;
storing the measured environmental data;
generating at least one control signal on the basis of currently acquired environmental data and on the basis of previously acquired environmental data; and
adjusting the at least one operational parameter of the wind turbine on the basis of the control signal.

17. The method in accordance with claim 16, wherein the step of generating the at least one control signal on the basis of currently acquired environmental data and on the basis of previously acquired environmental data comprises:
providing at least one maximum allowable difference value between currently acquired environmental data and future environmental data; and
generating the at least one control signal on the basis of currently acquired environmental data and on the basis of the at least one maximum allowable difference value.

18. The method in accordance with claim 16, wherein the at least one maximum allowable difference value is determined from a wind flow model based on fluid mechanics.

19. The method in accordance with claim 16, wherein the at least one operational parameter is the yaw angle the machine nacelle of the wind turbine.

20. The method in accordance with claim 16, wherein the at least one operational parameter is the pitch angle of the at least one rotor blade of the wind turbine.

21. The method in accordance with claim 16, wherein the at least one control signal is provided on the basis of the rotational position of the rotor.

22. The method in accordance with claim 16, wherein the environmental data are at least one of a wind direction, a wind velocity, an angle of attack, a temperature and an air density at the location of the wind turbine.

23. The method in accordance with claim 16, wherein the at least one control signal is provided on the basis of the rotational position of the rotor.

24. The method in accordance with claim 16, wherein a continuous pitching of the at least one rotor blade is performed on the basis of the control signal.

* * * * *